Aug. 10, 1943.

M. C. DODGE 2,326,526

MOLDED PLASTIC BODY

Filed Feb. 20, 1940

Inventor
Milo C. Dodge,
By Church & Church
His Attorneys

Patented Aug. 10, 1943

2,326,526

UNITED STATES PATENT OFFICE 2,326,526

MOLDED PLASTIC BODY

Milo C. Dodge, Auburn, N. Y., assignor to Columbian Rope Company, Auburn, N. Y., a corporation of New York Application February 20, 1940, Serial No. 319,963

2 Claims. (Cl. 242—119)

This invention relates to improvements in molded plastic bodies simulating, in weight and porosity, natural wood articles and, particularly, bobbin heads or the end flanges of the spindles of bobbins.

The primary object of the invention is to provide a molded plastic material with which articles or bodies can be formed very closely resembling natural wood articles, particularly in that the present body or article will substantially correspond in weight, density and porosity to a natural wood body.

Another object is to provide a molded plastic body or article corresponding to a natural wood article in weight and porosity, but of higher impact strength.

A further object is to provide a molded plastic body composed of fibre filler and binder in which the cellular characteristics of the fibres and the arrangement of fibres in the mass will impart to the mass a marked ability to resist compression.

Still another object of the invention is to provide a comparatively inexpensive bobbin which will withstand the normal rough usage to which it is placed, particularly in that it will not splinter or fracture when dropped or when sudden shocks or impacts are imposed thereon.

Another object is to provide a bobbin with heads or ends made of molded plastic material and which will be substantially shatter-proof in that they will not disintegrate or fly apart under centrifugal force.

Further, the invention seeks to provide a bobbin head or other molded plastic body of comparatively high porosity and correspondingly low specific gravity and low density quite closely resembling natural wood, but in which the density may be controlled during the manufacture thereof.

With these and other objects in view, the invention consists in certain details of construction and combinations and arrangements of parts, all as will hereinafter be more fully described, and the novel features thereof particularly pointed out in the appended claims.

In the accompanying drawing—

It has heretofore been proposed to form various articles or bodies and, specifically, the heads of textile bobbins, of various materials, such as wood, metal and, in some instances, laminated bodies of fibrous material, the latter having been proposed primarily for the reason that heads made essentially of laminations of fibres are grainless and will not chip, splinter or split, as will bobbin heads made of natural wood. However, one difficulty encountered in the use of bobbins provided with heads made as just indicated has been that the heads are unduly dense or heavy as compared to the natural wood bobbins. This matter of weight is quite an important factor due to the high speeds at which the bobbins are revolved in use. It is also important that the bobbins be of uniform weight because it is not only necessary that they be interchangeably used but multiple bobbins are often used on rotating flyers and must, therefore, balance. Further, the compensation of mill operatives is generally determined by means of wage schedules based on poundage so that here, again, it is essential that the bobbins be of uniform weight.

I have discovered that various fibres possess differing cellular characteristics. Some fibres, known as "soft" fibres, have a comparatively small cell structure with the result that they do not possess any appreciable degree of resiliency and, when compressed or molded, a body formed thereof possesses a comparatively high degree of density. On the other hand, fibres known as "hard" fibres have a peculiar cellular arrangement or cell structure and possess a marked degree of resiliency. These hard fibres have a rather elongated cell structure which prevents their molding to the same density under a given pressure as the less bulky or soft fibres. Again, the cell characteristics of these hard fibres result in a mass of the same being less absorptive than a mass of soft fibres, a factor which is important in the production of bobbin heads and other articles, because, being less absorptive, the mass of hard fibres will not take up as much binder as the more highly absorptive soft fibres. As a result, with the use of hard fibres, bobbin heads of less density and, therefore, of less weight, can readily be produced. In my investigations, I have found that, of the hard fibres, the sisals are probably the best adapted for the production of low-density, light-weight and comparatively highly porous articles, such as bobbin heads, because sisal possesses all the desirable characteristics above outlined. It will be appreciated, however, that the same result can be produced with other hard fibres which need not necessarily be of vegetable origin.

Figure 1:
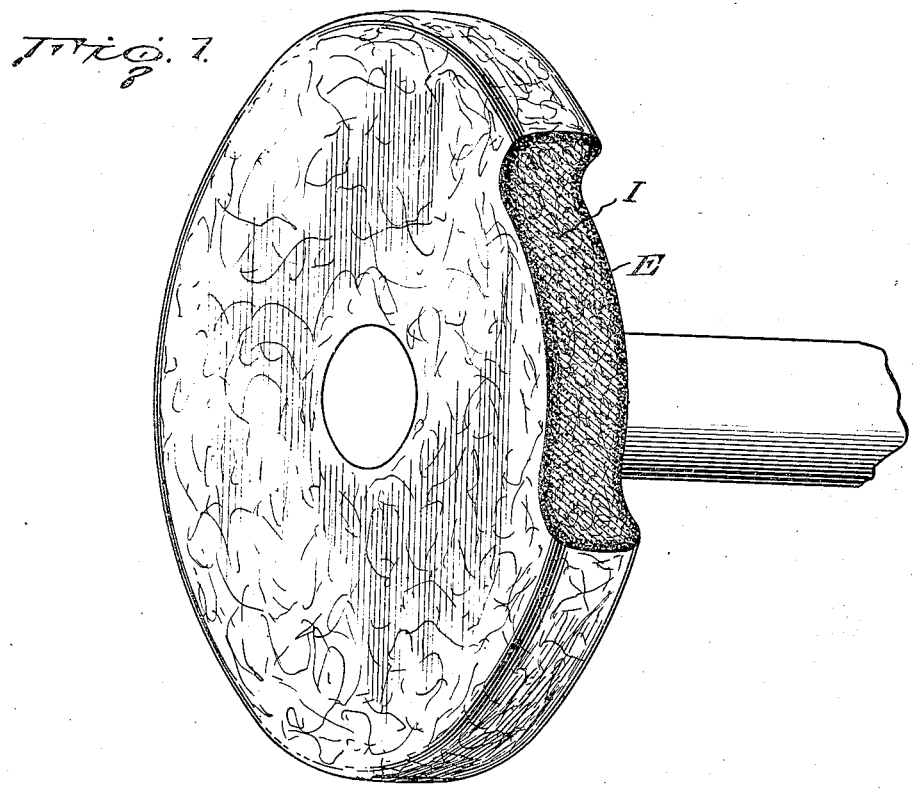
Figure 1 is a perspective view of a bobbin embodying the present improvements, one of the heads or end flanges being partly broken away.
Figures 2, 3:
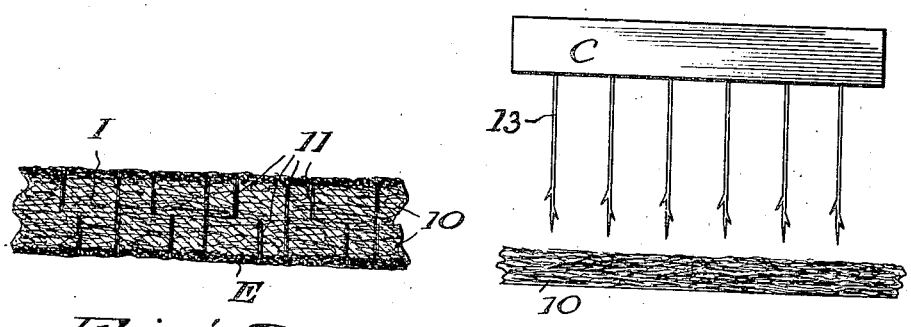
Fig. 2 is a detail sectional view through a body of material of which the bobbin heads are formed, this view being somewhat enlarged to more clearly illustrate the peculiar arrangement of the fibres used in said body of material.
Fig. 3 is a diagrammatic illustration of a so-called needle felting machine.

In carrying out the present invention, the article, such as the bobbin head illustrated in the drawing, is preferably formed of one or more laminations or discs of hard fibres coated and, to some extent, impregnated with a suitable binder and molded to the desired shape under heat and pressure. For this reason, a thermosetting resin binder, or a thermo-plastic binder, such as a phenol formaldehyde resin binder of the heat hardenable type is preferably used. The number of laminations entering into a head, or other article, will depend upon the thickness desired in the finished head or article and the thickness of the original discs or laminations used in the production thereof. For purposes of illustration there is shown in Fig. 2 a plurality of laminations 10 of sisal fibres treated with a solution of a phenol resin binder of the heat hardenable type. Assuming that Fig. 2 illustrates portions of a number of plies sufficient to form a head of desired thickness, the same are packed in a mold and the molding operation carried out in the conventional manner as to temperatures and pressure, all as is well understood in the plastic molding art. As more particularly illustrated in Fig. 2, the plies or laminations E at the surface of the mass may be more highly impregnated than the plies I constituting the interior of the mass. In this fashion, the article, when molded, will be capable of repelling water or liquids due to the increased density of the exterior laminations E, although the total weight of the article will not be materially increased due to the fact that these exterior laminations are comparatively thin and the major portion of the article composed of the interior laminations I is of comparatively low density and more highly porous. This increased porosity and lower density, particularly of the interior of the molded mass, is due primarily to the naturé of the fibres constituting the filler. In other words, with a hard fibre, such as sisal, the cellular characteristics are such that the fibres tend to resist being compressed and, consequently, a given area, so to speak, filled with such fibres and compressed under a definite pressure, will be more porous and of less weight than if a soft fibre were used.

To impart high impact strength or high resistance to certain shocks, and to further increase the resistance of a mass of such hard fibres in the mold to the molding pressure, the fibres of the individual laminations or webs are manipulated so as to form groups or tufts of fibres disposed transversely of the web. These transversely disposed tufts of fibres 11 substantially interlock the surrounding fibres and, if desired, two or more laminations or plies can be operated upon while in superimposed relationship so that some of the tufts or groups will extend from one ply or web into the next adjacent ply or web. This formation of the tufts 11 can be obtained by the use of the so-called needling instrumentalities of a needle felting machine, as illustrated more or less diagrammatically in Fig. 3. Such a machine comprises a plurality of reciprocatory needles 13 having barbs formed thereon whereby the tufts or groups 11 will be pushed or pulled through the web or webs 10 when said needles are projected and retracted through the same. In usual practice, the needles pass entirely through the web and this so-called needling or gigging operation is preferably carried out before the fibre is treated with the binder.

An article, such as a bobbin head, thus formed of sisal or other hard fibres in needled plies and treated with a binder, for instance, a solution of phenol formaldehyde resin binder of the heat hardenable type, possesses a very high impact strength and will not chip or splinter when dropped or otherwise subjected to sudden shocks. As previously stated, a hard fibre, such as sisal, has the peculiar cellular structure or arrangement which imparts thereto a certain amount of resiliency so that it does not compress as readily as softer or less bulky fibres, such as flax and, consequently, will not mold to the same density as flax. It will also be observed that, with the needled tufts of fibres extending transversely through the plies of fibres, such tufts of fibres are arranged endwise, so to speak, with respect to the lines of compression when one or more plies are placed flatwise in the mold. Thus, the tufted groups of fibres not only increase the bulkiness of the mass of fibres formed by the ply or plies in the mold but this endwise disposition of the tufts augments the resistance of that mass or bulk of fibres to compression in the mold. It necessarily follows, therefore, that a bobbin head produced according to the present invention is not as dense as would be one made of softer fibres, nor is it as heavy as a head made of less bulky fibres. This is true because, if a less bulky fibre or one that is more readily compressed is used, a larger volume or mass of the softer fibres is required to fill a given area when compressed in the mold and, consequently, the finished product would be denser, less porous, and of greater weight.

Due to the use of needled, hard fibres, which results in a lesser quantity of fibres being used in an article of given thickness, the finished product substantially corresponds to natural wood in density, porosity and weight. Bobbin heads made in accordance with the present invention are quite comparable to heads of natural wood and, due to their comparative lightness in weight, can be used at high speeds. As previously stated, the subjection of bobbin heads to centrifugal force is a matter of serious consideration and, in some instances, might prohibit the use of heavier bobbins. Again, the factor of weight is important due to the large number of bobbins used in a mill, the number, in some instances, becoming a serious factor in the mill floor load. Due to the high bulk factor or to the wiriness or springiness of the fibre in this needled form, articles of lower density can be formed than can be obtained with fibres having a less bulk factor which, as pointed out, lends to the production of a bobbin head quite closely resembling wood, so that bobbins made according to the present invention can be interchangeably used with other bobbins, even of wood, of corresponding size and weight, a feature which is of importance due to the fact that mill operatives are frequently compensated in accordance with wage payment schedules reckoned on poundage produced. This feature is also important in eliminating unbalanced conditions where several bobbins are used on a rotating flier as, for instance, in a ropemaking machine.

Another important feature is that the structure or arrangement of cells in a hard fibre, such as sisal, imparts to the fibre comparatively low absorptive properties so that an article made according to the present invention does not take up the binder as readily as a more highly absorbent fibre. This characteristic of this particular type of fibre, therefore, further lends to the production of a light bobbin head more closely resembling a head of natural wood. In other words, the nature of the hard fibre aids in minimizing the quantity of binder taken up so as to facilitate control of the weight of the molded article. It might be added that the porosity of the mass of fibres constituting the bobbin head is dependent, primarily, upon the interstices between fibres in the compressed mass, so that, by controlling the impregnation of the mass of fibres with the binder, a highly porous head or a head of low density can readily be produced according to the present invention. However, as previously pointed out, the fibres E at the surface of the head can be more highly impregnated than the interior fibres I so as to render the article substantially water or liquid repellent on the surface without materially increasing the weight or density or decreasing the porosity of the article as a whole.

What I claim is:

1. A molded plastic bobbin head formed of a mass of fibers constituting a filler and a thermosetting binder molded under heat and pressure, the cellular characteristics of said fibers imparting to said mass a substantial resistance to compression, whereby the mass tends to retain its bulkiness and porosity, and groups of said fibers being disposed in tufts transversely of said mass and further increasing the resistance of the mass to compression, the density, porosity and weight of said bobbin head substantially corresponding to that of a bobbin head made of natural wood, whereby said molded bobbin head can be used interchangeably with bobbin heads of natural wood.

2. A molded plastic bobbin head formed of a mass of fibers constituting a filler and a thermosetting binder molded under heat and pressure, the cellular characteristics of said fibers imparting to said mass a substantial resistance to compression, whereby the mass tends to retain its bulkiness and porosity, and groups of said fibers being disposed in tufts transversely of said mass to further increase the resistance of the mass to compression and to increase the shock resistance of the molded article, the surface portion of said head having a greater proportion of binder therein than the interior to render said surface substantially liquid-repellent, and the weight of said head and the density and porosity of the interior thereof substantially corresponding to those properties of a bobbin head made of natural wood, whereby the molded plastic bobbin head can be used interchangeably with heads of natural wood.

MILO C. DODGE.